US010025695B2

United States Patent
Cai et al.

(10) Patent No.: US 10,025,695 B2
(45) Date of Patent: Jul. 17, 2018

(54) ENHANCING GUI AUTOMATION TESTING USING VIDEO

(71) Applicant: International Business Machines Corporation, Armonk, NY (US)

(72) Inventors: Zhu Hong Cai, Beijing (CN); Dong Rui Li, Beijing (CN); Miao Liu, Beijing (CN); Ying Shen, Beijing (CN); Kui Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/134,455

(22) Filed: Apr. 21, 2016

(65) Prior Publication Data
US 2017/0139812 A1 May 18, 2017

Related U.S. Application Data

(63) Continuation of application No. 14/944,581, filed on Nov. 18, 2015, now Pat. No. 9,348,727.

(51) Int. Cl.
*G06F 11/00* (2006.01)
*G06F 11/36* (2006.01)
*G06F 8/38* (2018.01)

(52) U.S. Cl.
CPC ............ *G06F 11/3664* (2013.01); *G06F 8/38* (2013.01); *G06F 11/3684* (2013.01)

(58) Field of Classification Search
CPC .. G06F 11/36; G06F 11/3612; G06F 11/3664; G06F 11/3684; G06F 3/04842; G06F 3/048; G06F 8/38
See application file for complete search history.

(56) References Cited

U.S. PATENT DOCUMENTS

| | | | |
|---|---|---|---|
| 6,907,546 B1 * | 6/2005 | Haswell | G06F 11/3684 714/38.11 |
| 8,881,195 B2 | 11/2014 | Clements | |
| 9,015,654 B2 | 4/2015 | Kaasila et al. | |
| 9,207,952 B2 | 12/2015 | Chiantera et al. | |
| 9,519,570 B2 * | 12/2016 | Srinivasan | G06F 11/3664 |

(Continued)

OTHER PUBLICATIONS

Pham et al., "Tailoring video recording to support efficient GUI testing and debugging", © Springer Science+Business Media New York 2013, Published online: Jun. 20, 2013, DOI 10.1007/s11219-013-9206-2, 20 pages.

(Continued)

*Primary Examiner* — Michael Maskulinski
(74) *Attorney, Agent, or Firm* — Edward J. Wixted, III

(57) ABSTRACT

A method, computer program product, and system for testing an application on a GUI are provided. A request to perform a test of an application is received. The test uses a script that includes instructions to perform real actions on a GUI of the application. Execution of the script is initiated. A test recording is generated by capturing a first plurality of screenshots of the GUI during the test. In response to detecting an error during execution of the script, a baseline video is retrieved. The baseline video includes a second plurality of screenshots of the GUI from a successful execution of the script. An error message is issued. The error message includes at least a portion of the test recording and at least a portion of the baseline video.

20 Claims, 4 Drawing Sheets

(56) References Cited

U.S. PATENT DOCUMENTS

| | | | |
|---|---|---|---|
| 9,804,955 B2* | 10/2017 | Gillespie | G06F 11/368 |
| 9,841,826 B2* | 12/2017 | Cheng | G06F 3/03 |
| 2010/0057405 A1 | 3/2010 | Wu | |
| 2011/0276946 A1 | 11/2011 | Pletter | |
| 2014/0176570 A1 | 6/2014 | Shi | |
| 2015/0269059 A1 | 9/2015 | Srinivasan et al. | |

OTHER PUBLICATIONS

List of IBM Patents or Patent Applications Treated as Related, Dated Apr. 21, 2016, 2 pages.

U.S. Appl. No. 14/944,581, filed Nov. 18, 2015, Entitled "Enhancing GUI Automation Testing Using Video".

\* cited by examiner

US 10,025,695 B2

ENHANCING GUI AUTOMATION TESTING USING VIDEO

BACKGROUND OF THE INVENTION

The present invention relates generally to the field of graphical user interface (GUI) automation testing, and more particularly to enhancing the legibility of a GUI automation testing log using video.

GUI automation testing is the process of testing a software with a GUI to ensure the software executes properly. Generally, GUI testing is done through a variety of test cases. In many instances, an error message is issued when a problem occurs in the course of executing the GUI automation testing. In some instances, a static screenshot of the GUI, at the time the problem occurred, is issued. A tester uses the error message and corresponding screenshot to determine the source of the error.

SUMMARY

According to one embodiment of the present invention, a method for testing an application on a GUI is provided. The method includes receiving, by one or more processors, a request to perform a test of an application, the test using a script that comprises one or more instructions to perform real actions on a GUI of the application; initiating, by one or more processors, execution of the script; generating, by one or more processors, a test recording by capturing a first plurality of screenshots of the GUI during the test; in response to detecting an error during execution of the script, retrieving, by one or more processors, a baseline video, wherein the baseline video comprises a second plurality of screenshots of the GUI from a successful execution of the script; and issuing, by one or more processors, an error message, wherein the error message includes at least a portion of the test recording and at least a portion of the baseline video.

According to another embodiment of the present invention, a computer program product for testing an application on a GUI is provided. The computer program product comprises a computer readable storage medium and program instructions stored on the computer readable storage medium. The program instructions include program instructions to receive a request to perform a test of an application, the test using a script that comprises one or more instructions to perform real actions on a GUI of the application; program instructions to initiate execution of the script; program instructions to generate a test recording by capturing a first plurality of screenshots of the GUI during the test; in response to detecting an error during execution of the script, program instructions to retrieve a baseline video, wherein the baseline video comprises a second plurality of screenshots of the GUI from a successful execution of the script; and program instructions to issue an error message, wherein the error message includes at least a portion of the test recording and at least a portion of the baseline video.

According to another embodiment of the present invention, a computer system for testing an application on a GUI is provided. The computer system includes one or more computer processors, one or more computer readable storage media, and program instructions stored on the computer readable storage media for execution by at least one of the one or more processors. The program instructions include program instructions to receive a request to perform a test of an application, the test using a script that comprises one or more instructions to perform real actions on a GUI of the application; program instructions to initiate execution of the script; program instructions to generate a test recording by capturing a first plurality of screenshots of the GUI during the test; in response to detecting an error during execution of the script, program instructions to retrieve a baseline video, wherein the baseline video comprises a second plurality of screenshots of the GUI from a successful execution of the script; and program instructions to issue an error message, wherein the error message includes at least a portion of the test recording and at least a portion of the baseline video.

DETAILED DESCRIPTION

An embodiment of the present invention recognizes error messages in GUI automation testing vary in usefulness to testers. For example, the usefulness (e.g., legibility) of an error message often depends on how clearly a developer describes the error. In some instances, where a screenshot (e.g., static scene) of the GUI is included in the error message, a tester is unable to determine the problem without more context. An embodiment of the present invention recognizes that unclear error messages during GUI automation testing can increase the workload of a tester.

An embodiment of the present invention provides a baseline video of the test script successfully executed in the GUI. The availability of the baseline video with an error message provides context to a tester of the GUI automation test. In addition to providing a baseline video, an embodiment of the present invention provides a short clip of the GUI automation testing, allowing a tester to see where in the script the error occurred. By comparing the baseline video to the testing clip, a tester can pinpoint the cause of the error in the test script.

Figure 1:
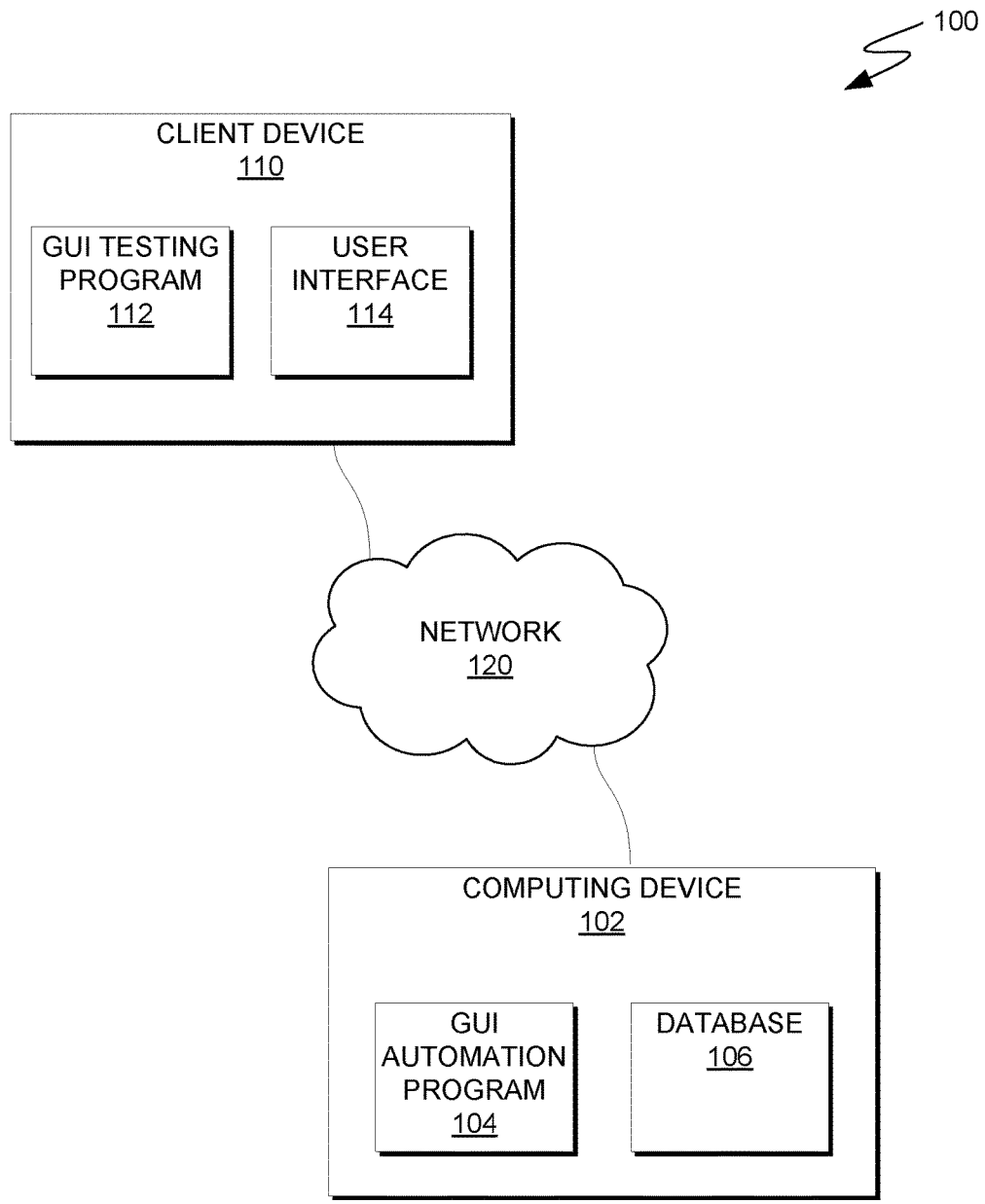
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes GUI automation program 104 and database 106.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to and/or capable of executing some or all of GUI testing program 112 and database 106 and is capable of executing GUI automation program 104. Computing device 102 may include internal and external hardware components, as depicted and described in further detail with respect to FIG. 4.

In this exemplary embodiment, GUI automation program 104 and database 106 are stored on computing device 102. In other embodiments, one or both of GUI automation program 104 and database 106 may reside on another computing device, provided that each can access and is accessible by each other of GUI automation program 104, database 106 and GUI testing program 112. In yet other embodiments, one or both of GUI automation program 104 and database 106 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

GUI automation program 104 operates to run test script for an application on a GUI and create a baseline video of the test script. In some embodiments, the test script includes valid statements. A valid statement is script that causes a change in the appearance of the GUI. When GUI automation program 104 runs a valid statement, the appearance of the GUI before the statement is different than the appearance of the GUI after the statement. For example, inputting characters, clicking buttons, and interacting with menus are valid statements. Invalid statements are script that do not cause a change in the GUI. When GUI automation program 104 runs an invalid statement, the appearance of the GUI is the same before and after the statement. For example, sleeping and waiting (e.g., where actions in the GUI are anticipated, but no changes occur) are examples of invalid statements. In some embodiments, GUI automation program 104 is used in the developing stages of GUI coding. GUI automation program 104 receives a portion of a test script in the final stage of GUI development. In response to receiving the test script, GUI automation program 104 runs the test script and records a baseline video of the GUI. GUI automation program 104 embeds the test script in the baseline video. For example, a portion of the test script corresponds to a screenshot of the GUI in the baseline video. In some embodiments, the test script is embedded with metadata. For example, each frame of the baseline video can have metadata associated with the frame embedded in the baseline video. In another example, less than all of the frames have associated metadata embedded in the baseline video. In some embodiments, the metadata contains information including segments of the script, line numbers, frame numbers, parameters, and developer notes. The test script corresponding to each screenshot will appear below the screenshot in the final baseline video.

Database 106 is a data repository that may be written to and read by one or both of GUI automation program 104 and GUI testing program 112. GUI baseline videos may be stored to database 106. In some embodiments, GUI testing videos may also be stored to database 106. In some embodiments, database 106 may be written to and read by programs and entities outside of computing environment 100 in order to populate the repository with GUI baseline videos or test script.

In various embodiments of the present invention, client devices 110 can be a laptop computer, a tablet computer, a netbook computer, a personal computer (PC), a desktop computer, a personal digital assistant (PDA), a smart phone, or any programmable electronic device capable of communicating with computing device 102 via network 120. Client device 110 includes GUI testing program 112 and user interface 114, which execute locally on client device 110. In some embodiments, GUI testing program 112 and/or user interface 114 can be stored on another computing device (e.g., computing device 102) such that each can access and can be accessed by GUI automation program 104 and database 106.

GUI testing program 112 operates to test a function of an application in the GUI and output a video of GUI screenshots when an error occurs during the testing. In some embodiments, an error may occur in the process of testing an application function. GUI testing program 112 records a video of screenshots for a predetermined time period (e.g., a predetermined number of screenshots) prior to the error. In response to receiving an error in the GUI testing, GUI testing program 112 retrieves the portion of the baseline video corresponding to error in the test script. GUI testing program 112 simultaneously plays the test video and the baseline video to allow the user to determine the source of the error.

Client device 110 includes user interface (UI) 114, which executes locally on client device 110 and operates to provide a UI to a user of client device 110. User interface 114 further operates to receive user input from a user via the provided user interface, thereby enabling the user to interact with client device 110. In one embodiment, user interface 114 provides a user interface that enables a user of client device 110 to interact with GUI automation program 104 of computing device 102 via network 120. In various examples, the user interacts with GUI automation program 104 in order to create a baseline video of the GUI function. In another embodiment, user interface 114 provides a user interface that enables a user of client device 110 to interact with GUI testing program 112. In various examples, the user interacts with GUI testing program 112 in order to test a function of an application in the GUI and record the testing. In one embodiment, user interface 114 is stored on client device 110. In other embodiments, user interface 114 is stored on another computing device (e.g., computing device 102), provided that user interface 114 can access and is accessible by at least GUI automation program 104 and GUI testing program 112.

Figure 2:
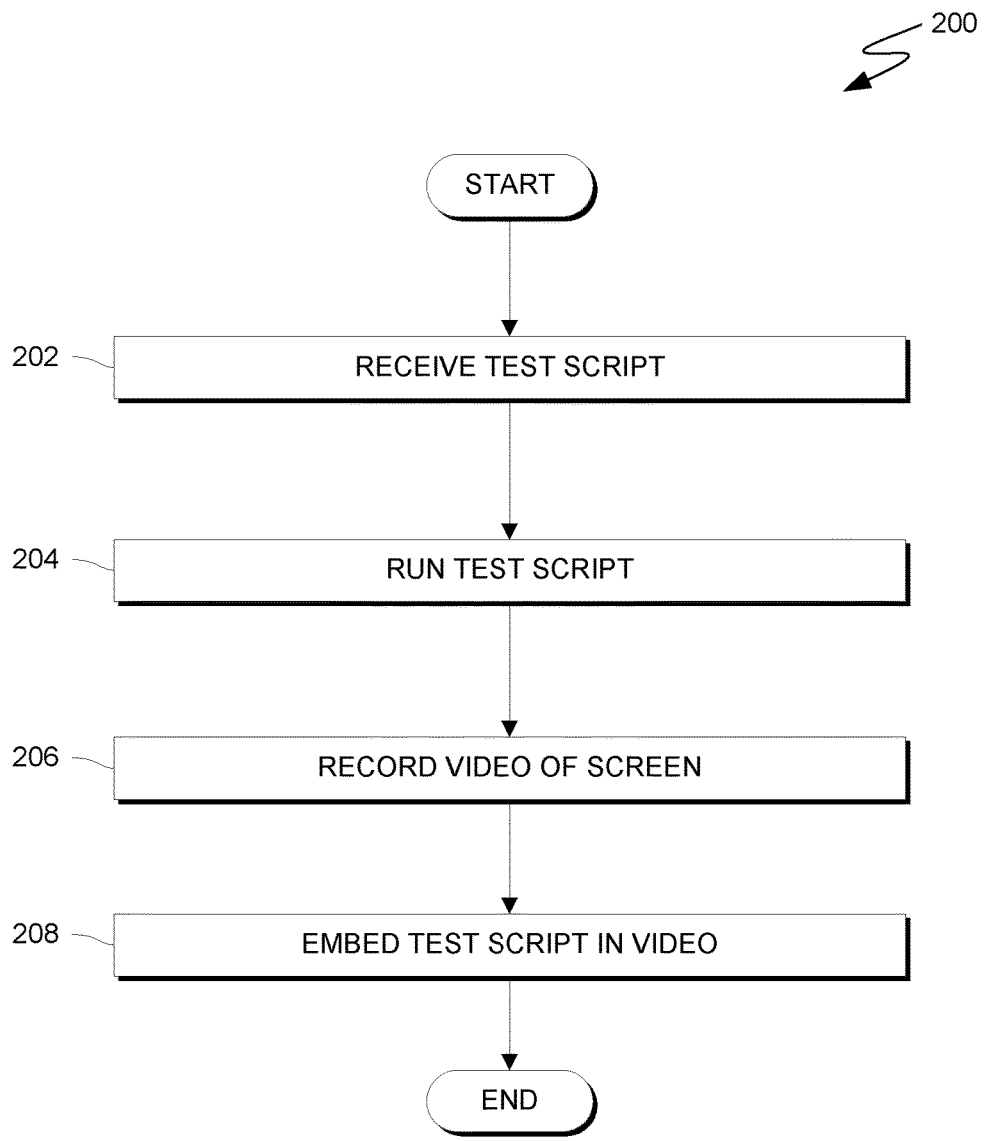
FIG. 2 is a flowchart depicting operations for creating a baseline GUI testing video, on a computing device within the computing environment of FIG. 1, in accordance with an embodiment of the present invention.

FIG. 2 is a flowchart depicting operations for creating a GUI baseline video, on a computing device within the computing environment of FIG. 1, in accordance with an embodiment of the present invention. For example, FIG. 2 is a flowchart depicting operations 200 of GUI automation program 104, on computing device 102 within computing environment 100.

In step 202, GUI automation program 104 receives a test script. In some embodiments, the test script is received in response to a developer finishing script for a function of the GUI. In other embodiments, the test script is a program designed to run in the GUI. The test script contains multiple lines of code for performing one or more functions in the GUI. In some embodiments, each line of code, or a grouping of code, causes a change in the GUI.

In step 204, GUI automation program 104 runs the test script. GUI automation program 104 intimates the test script, running through each line of the test script. As GUI automation program 104 run the test script, the image on the GUI changes.

In step 206, GUI automation program 104 records a video of GUI screenshots as the test script runs. GUI automation program 104 takes a screenshot of the GUI for each line or grouping of code. In some embodiments, the screenshots are saved in a video format. For example, a user can play the video and see the progression of the GUI as the test script progressed.

In step 208, GUI automation program 104 embeds the test script into the baseline video. GUI automation program 104 adds a portion of the test script to the corresponding screenshot. In some embodiments, the test script appears below the corresponding screenshot. For example, the test script appears as a subtitle or transcript to the screenshot. The baseline video comprises the GUI screenshots and corresponding test script. In some embodiments, a timestamp is added to each screenshot. For example, to indicate the length of time the test script was running when the screenshot was taken. In some embodiments, the script and timestamp are added to the video using a deamon process. The baseline video is saved to a database (e.g., database 106). The baseline video can be read from the database by a computing device when an error occurs while running script in the GUI. In some embodiments, a user uses the baseline video to determine the cause of an error in a GUI script.

Figure 3:
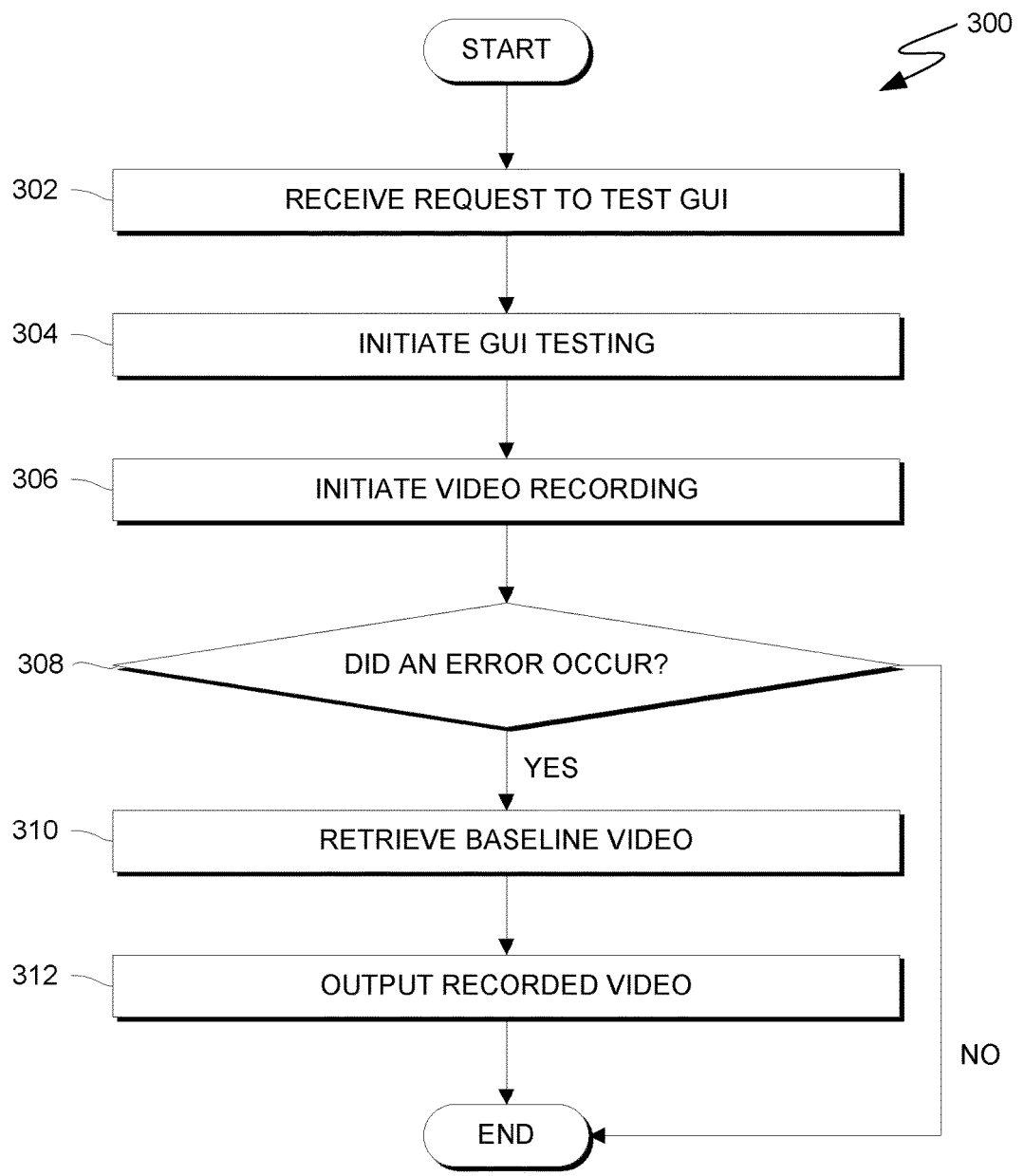
FIG. 3 is a flowchart depicting operations for GUI automation testing with video, on a computing device within the computing environment of FIG. 1, in accordance with an embodiment of the present invention.

FIG. 3 is a flowchart depicting operations for testing a GUI function, on a computing device within the computing environment of FIG. 1, in accordance with an embodiment of the present invention. For example, FIG. 3 is a flowchart depicting operations 300 of GUI testing program 112, on client device 110 within computing environment 100.

In step 302, GUI testing program 112 receives a request to test a function of an application having a script on a GUI. In some embodiments, the function is part of a program running in the GUI. For example, a software product with GUI functionality can be tested. In some embodiments, the request is from a user during the testing phase of a product. In step 304, GUI testing program 112 initiates the GUI testing. GUI testing program 112 begins to execute the script being tested.

In step 306, GUI testing program 112 initiates a video recording of the GUI throughout the GUI testing. In some embodiments, GUI testing program 112 takes a screenshot of the GUI each time a line or portion of script is executed. For example, each time the image on the GUI changes, a screenshot is taken. In some embodiments, the screenshots are maintained (e.g., in a database) until the testing is completed. In other embodiments, screenshots are only maintained for a specified amount of time. For example, GUI testing program 112 can maintain a number (e.g., ten) screenshots in a cache. If an error is does not occur within the specified time, the screenshot is discarded. For example, where an error occurs in the script corresponding to the fifteenth screenshot, screenshots one through five will be discarded and screenshots six through fifteen are maintained. Similarly to the steps in operations 200, subtitles including the test script are embedded in the corresponding screenshots. In some embodiments, the test script is embedded using metadata. For example, each frame of the testing video can have metadata associated with the frame embedded in the testing video. In another example, less than all of the frames have associated metadata embedded in the testing video. In some embodiments, the metadata contains information including segments of the script, line numbers, and frame numbers.

In decision 308, GUI testing program 112 determines whether an error occurred during the GUI testing. In some embodiments, GUI testing program 112 determines an error has occurred based on text in a prompt output to the GUI. For example, GUI testing program 112 differentiates between a pop-up in the GUI that prompts a user for information and a pop-up in the GUI that indicates an error has occurred. In other embodiments, an error is determined based on a log entry. For example, GUI testing program 112 monitors a logfile for the script for an entry that indicates an error has occurred. In other embodiments, an error is based on the application unexpectedly closing (i.e., crashing). For example, the application closes before the GUI testing program 112 runs the entire script. If GUI testing program determines that an error has occurred (decision 308, YES branch), then GUI testing program retrieves the baseline video (step 310). In some embodiments, GUI testing program 112 issues an error message in response to determining that an error has occurred. In some embodiments, a dialog box including the error message includes the video recorded in step 306 and the baseline video. If GUI testing program 112 determines that an error has not occurred (decision 308, NO branch), the script is run to completion.

In step 310, GUI testing program 112 retrieves the baseline video. GUI testing program 112 determines the time period in which the error occurred. In some embodiments, the time period is determined by using the timestamps on the video recorded in step 306. In another embodiment, the time period is determined by counting the lapsed screenshots. In some embodiments, the time period is used to find a portion of the baseline video relevant to the error. For example, where screenshot 50-60 are saved as the video recorded in step 306, GUI testing program 112 finds screenshots 50-60 in the baseline video. In some embodiments, the number of screenshots in the baseline video may not correspond directly to the screenshots in the testing video. For example, where script has been added or deleted, the number of screenshots in the baseline and test may vary. In these embodiments, GUI testing program 112 may use a text search function on the baseline video subtitles to find the portion of the baseline video that corresponds to the error message.

In step 312, GUI testing program 112 outputs the GUI testing video recorded in step 306. In some embodiments, the testing video is included in an error message. In other embodiments, the testing video is issued to a user in a separate dialog box. In some embodiments, the relevant portion of the baseline video, as determined in step 310, is output with the GUI testing video. The baseline video allows the tester to see how the software or function works without an error. The testing video allows the tester to see where the error occurred in the GUI testing. By comparing the baseline video and the testing video, a cause of error can be determined quickly.

Figure 4:
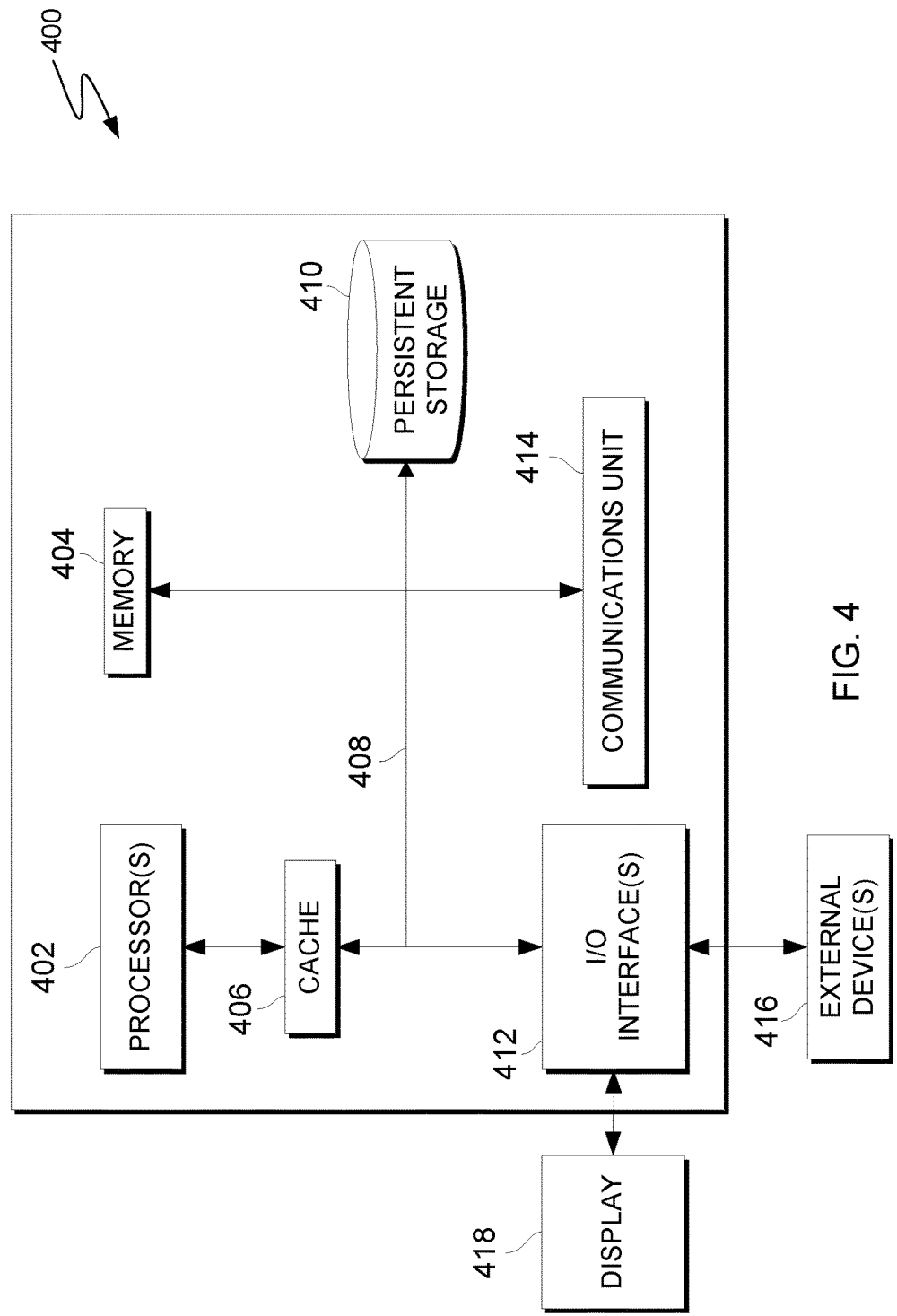
FIG. 4 is a block diagram of components of a computing device executing operations for GUI automation testing with video, in accordance with an embodiment of the present invention.

FIG. 4 is a block diagram of components of a computing device, generally designated 400, in accordance with an embodiment of the present invention. In one embodiment, computing device 400 is representative of computing device 102. For example, FIG. 4 is a block diagram of computing device 102 within computing environment 100 executing operations of GUI automation program 104. In another embodiment, computing device 400 is representative of client device 110. For example, FIG. 4 is a block diagram of client device 110 within computing environment 100 executing operations of GUI testing program 112.

It should be appreciated that FIG. 4 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 120. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 418 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   initiating, by one or more processors, execution of a script that comprises one or more instructions to perform real actions on a GUI;
   generating, by one or more processors, a test recording by capturing a first plurality of screenshots of the GUI during a test;
   in response to detecting an error during execution of the script, retrieving, by one or more processors, a baseline video, wherein:
     the baseline video comprises a second plurality of screenshots of the GUI from a successful execution of the script; and
     the script is embedded in the baseline video such that a portion of the script corresponds to a screenshot of the second plurality of screenshots of the GUI; and
   presenting, by one or more processors, an error message, wherein:
     the error message includes at least a portion of the test recording and at least a portion of the baseline video; and
     the portion of the baseline video further includes the portion of the script corresponding to the screenshot.

2. The method of claim 1, further comprising:
   determining, by one or more processors, a first segment of the first plurality of screenshots, the first segment comprising a predetermined number of sequential screenshots of the first plurality of screenshots, wherein at least one screenshot of the first segment depicts the GUI concurrently with an occurrence of the error; and
   discarding, by one or more processors, screenshots other than the first segment from the first plurality of screenshots.

3. The method of claim 2, further comprising:
   determining, by one or more processors, a second segment of the baseline video that corresponds to the first segment; and
   wherein the error message includes the first segment and the second segment.

4. The method of claim 1, wherein the baseline video comprises one or more metadata, and wherein each of the one or more metadata is selected from the group consisting of: a line number and a developer note.

5. The method of claim 4, wherein the one or more metadata are embedded in the baseline video by a daemon process.

6. The method of claim 1, wherein the test recording comprises one or more metadata, and wherein the one or more metadata is selected from the group consisting of: a segment of script, and a line number.

7. The method of claim 1, wherein the script comprises one or more valid statements.

8. A computer program product comprising:
a computer readable storage medium and program instructions stored on the computer readable storage medium, the program instructions comprising:
program instructions to initiate execution of the script that comprises one or more instructions to perform real actions on a GUI;
program instructions to generate a test recording by capturing a first plurality of screenshots of the GUI during a test;
in response to detecting an error during execution of the script, program instructions to retrieve a baseline video, wherein:
the baseline video comprises a second plurality of screenshots of the GUI from a successful execution of the script; and
the script is embedded in the baseline video such that a portion of the script corresponds to a screenshot of the second plurality of screenshots of the GUI; and
program instructions to present an error message, wherein:
the error message includes at least a portion of the test recording and at least a portion of the baseline video; and
the portion of the baseline video further includes the portion of the script corresponding to the screenshot.

9. The computer program product of claim 8, further comprising:
program instructions to determine a first segment of the first plurality of screenshots, the first segment comprising a predetermined number of sequential screenshots of the first plurality of screenshots, wherein at least one screenshot of the first segment depicts the GUI concurrently with an occurrence of the error; and
program instructions to discard screenshots other than the first segment from the first plurality of screenshots.

10. The computer program product of claim 9, further comprising:
program instructions to determine a second segment of the baseline video that corresponds to the first segment; and
wherein the error message includes the first segment and the second segment.

11. The computer program product of claim 8, wherein the baseline video comprises one or more metadata, and wherein each of the one or more metadata is selected from the group consisting of: a line number and a developer note.

12. The computer program product of claim 11, wherein the one or more metadata are embedded in the baseline video by a daemon process.

13. The computer program product of claim 8, wherein the test recording comprises one or more metadata, and wherein the one or more metadata is selected from the group consisting of: a segment of script, and a line number.

14. The computer program product of claim 8, wherein the script comprises one or more valid statements.

15. A computer system comprising:
one or more computer processors;
one or more computer readable storage media;
program instructions stored on the computer readable storage media for execution by at least one of the one or more processors, the program instructions comprising:
program instructions to initiate execution of the script that comprises one or more instructions to perform real actions on a GUI;
program instructions to generate a test recording by capturing a first plurality of screenshots of the GUI during a test;
in response to detecting an error during execution of the script, program instructions to retrieve a baseline video, wherein:
the baseline video comprises a second plurality of screenshots of the GUI from a successful execution of the script; and
the script is embedded in the baseline video such that a portion of the script corresponds to a screenshot of the second plurality of screenshots of the GUI; and
program instructions to present an error message, wherein:
the error message includes at least a portion of the test recording and at least a portion of the baseline video; and
the portion of the baseline video further includes the portion of the script corresponding to the screenshot.

16. The computer system of claim 15, further comprising:
program instructions to determine a first segment of the first plurality of screenshots, the first segment comprising a predetermined number of sequential screenshots of the first plurality of screenshots, wherein at least one screenshot of the first segment depicts the GUI concurrently with an occurrence of the error; and
program instructions to discard screenshots other than the first segment from the first plurality of screenshots.

17. The computer system of claim 16, further comprising:
program instructions to determine a second segment of the baseline video that corresponds to the first segment; and
wherein the error message includes the first segment and the second segment.

18. The computer system of claim 15, wherein the baseline video comprises one or more metadata, and wherein each of the one or more metadata is selected from the group consisting of: a line number and a developer note.

19. The computer system of claim 18, wherein the one or more metadata are embedded in the baseline video by a daemon process.

20. The computer system of claim 15, wherein the test recording comprises one or more metadata, and wherein the one or more metadata is selected from the group consisting of: a segment of script, and a line number, and wherein the script comprises one or more valid statements.

* * * * *